United States Patent [19]
Becoat

[11] Patent Number: 5,116,070
[45] Date of Patent: May 26, 1992

[54] DUAL WHEEL DRIVEN BICYCLE

[76] Inventor: Billie J. Becoat, 914 Hampton, Alton, Ill. 62002

[21] Appl. No.: 647,590

[22] Filed: Jan. 29, 1991

Related U.S. Application Data

[63] Continuation-in-part of Ser. No. 404,695, Sep. 8, 1989, Pat. No. 5,004,258.

[51] Int. Cl.$^5$ .............................................. B62M 1/02
[52] U.S. Cl. ........................... 280/259; 74/665 GE; 280/260; 280/261
[58] Field of Search ............... 280/259, 260, 261, 210, 280/230, 249; 74/665 GE

[56] References Cited

U.S. PATENT DOCUMENTS

| | | | |
|---|---|---|---|
| 559,934 | 5/1896 | Cunningham | 280/261 |
| 567,042 | 9/1896 | Raymond | 280/234 |
| 613,943 | 11/1898 | Schaibly | 280/234 |
| 622,758 | 4/1899 | Crutchfield | 280/260 |
| 3,193,305 | 7/1965 | Hendricks | 280/225 |
| 3,485,508 | 12/1969 | Hudnall | 280/234 |
| 3,823,959 | 7/1974 | Winters | 280/234 |
| 3,873,128 | 3/1975 | Dunder | 280/236 |
| 4,029,332 | 6/1977 | Davis | 280/234 |
| 4,417,742 | 11/1983 | Intengan | 280/249 |
| 4,479,600 | 10/1984 | Pattison | 280/261 |
| 4,895,385 | 1/1990 | Becoat | 280/259 |
| 5,004,258 | 4/1991 | Becoat | 280/259 |

OTHER PUBLICATIONS

Rokon Trail-Breaker.
B. W. Elliott Manufacturing Co. of Binghampton, N.Y., Advertising brochure No. 326.
S. S. White Industrial Products, Division of Penwalt, Flexible Power Blueprint #1.
Suhner, Switzerland, Advertising Brochure on flexible drive shafts.
Suhner, Switzerland, Advertising Brochure on flexible shafts.
Vert Velo, French magazine, Jan./Feb., 1991 issue, "The Snake", p. 28.

*Primary Examiner*—Mitchell J. Hill
*Attorney, Agent, or Firm*—Lawrence E. Evans, Jr.

[57] ABSTRACT

The dual wheel driven bicycle utilizes an elongate flexible shaft or cable for transferring rotational motion or torque to the front wheel. In the preferred embodiment, a rear ring gear is mounted on the rear wheel to drive a rear gear assembly. One end of the elongate flexible shaft is connected to and driven by the rear gear assembly; the opposite end of the elongate flexible shaft is connected to a front gear assembly which engages and drives a front ring gear connected to the front wheel. A freewheel assembly is interposed between the front ring gear and the hub of the front wheel to facilitate cornering. In an alternative embodiment, the freewheel assembly is an integral part of the front gear assembly. This invention is applicable to multispeed and single speed bicycles.

4 Claims, 7 Drawing Sheets

DUAL WHEEL DRIVEN BICYCLE

CROSS-REFERENCE TO RELATED APPLICATIONS

This application is a continuation-in-part of U.S. patent application Ser. No. 04/404,695 filed on or about Sep. 8, 1989 which issued as U.S. Pat. No. 5,004,258 on Apr. 2, 1991 entitled Kit for Converting a Bicycle to a Dual Wheel Driven Cycle which is a continuation of U.S. Pat. No. 4,895,385 which issued on Jan. 23, 1990 entitled Kit for Converting a Bicycle to a Dual Wheel Driven Cycle.

BACKGROUND OF THE INVENTION

1. Field of the Invention

This invention relates to bicycles, and more specifically to a dual wheel driven bicycle which uses an elongate flexible shaft or cable to provide rotational movement to the front wheel.

2. Description of the Prior Art

Inventors have been dreaming of a practical dual wheel driven bicycle for many years; unfortunately, none of these dreams have produced a practical dual wheel driven bicycle which can be easily and economically massed produced.

U.S. Pat. No. 4,029,332 which issued on Jun. 14, 1977 describes a rotacycle having a two-wheel drive system. The rotacycle discarded the chain and sprocket drive system of conventional bicycles and substituted an automatic variable-speed transmission which utilized a large rotor which was positioned between the front and rear tires. Rotational forces from the pedals were transferred from this transmission to the front and rear wheels by a system of belts, pulleys and opposing drive wheels which captured the opposing sidewalls of the tires. The rotacycle had an unusual appearance because it did not have a conventional chain and sprocket, and because of the large variable speed transmission which was positioned between the front and rear tires. The rotacycle has never achieved commercial success.

U.S. Pat. No. 4,479,660 which issued on Oct. 30, 1984, describes a two wheel synchronously driven bicycle. This synchronously driven bicycle utilizes a conventional power train to drive the rear wheel including pedals, cranks, a pedal sprocket, a continuous chain, and a rear sprocket. The front wheel is driven by a continuous belt. A drive pulley is connected to the conventional pedal sprocket and a front pulley is connected to the hub of the front wheel. The front pulley and the front wheel assembly includes a freewheeling hub. The continuous belt is stretched between the drive pulley on the pedal sprocket and the front pulley on the front wheel. Additional pulleys located near the handlebars guide the belt during rotation around the drive pulley on the pedal sprocket and the front pulley on the front wheel. Rotational forces from the pedals are transferred to the pedal sprocket which actuates both the continuous chain and the continuous belt providing torque to both the rear and front wheels respectively. This continuous belt requires constant tensioning and a special apparatus is provided for this purpose. The tensioning device and the continuous belt are relatively cumbersome, and may interfere with the operator's pedaling motion. This two wheel synchronously driven bicycle has never achieved commercial success.

The present invention relies upon an elongate flexible shaft or cable to transmit rotational forces to the front wheel, instead of the belts and pulleys utilized by the prior art.

SUMMARY OF THE INVENTION

The present invention is a dual wheel driven bicycle which can be either a multi-speed design or a single speed design. Applicant believes that he is the first to use an elongate flexible shaft to transfer rotational movement or torque to the front from the rear wheel of a bicycle. The elongate flexible shaft can be readily purchased from several suppliers in the United States and abroad, and is conventionally used in many other non-bicycle applications. To facilitate manufacture, this invention, in the best mode, continues to utilize a conventional drive system for the rear wheel including pedals, cranks, a pedal sprocket, a continuous chain and rear sprocket. Multi-speed designs continue to utilize a conventional derailleur mechanism with conical rear sprocket and multiple pedal sprocket to drive the rear wheel.

Application of the elongate flexible shaft or cable to bicycles has produced what is believed to be the first practical dual wheel driven bicycle.

The dual wheel driven bicycle is mechanically more efficient than conventional rear drive bicycles. The present invention provides more traction with the road surface than conventional rear drive bicycles and therefore has less slippage. It is also believed to be more maneuverable.

The elongate flexible shaft is connected on one end to a drive means which causes the shaft to rotate and on the other end to a motive means which transfers the rotational movement to the front wheel.

For multi-speed bicycles the best place to connect the drive means is with the rear wheel.

According to the present invention, the drive means includes a rear ring gear mounted on the rear wheel and a rear gear assembly mounted on the frame to engage and be driven by the rear ring gear. The rear ring gear and the rear wheel are rigidly connected thus imparting rotational motion to the rear ring gear when the rear wheel is actuated by the conventional drive system. The rotational movement of the rear ring gear is transferred by the rear gear assembly to the elongate flexible shaft. The motive means includes a front ring gear and front gear assembly. A front ring gear is mounted on the front wheel and a front gear assembly is mounted on the frame adjacent the front ring gear to engage and drive the front ring gear. The rotational forces from the elongate flexible shaft are transferred by the front gear assembly to the front ring gear which transfers the rotational movement or torque to the front wheel.

When a bicycle goes around a corner it is a well known phenomenon, to those skilled in the art, that the front wheel turns at a faster rate than the rear wheel. In this situation, the ring gears and the gear assemblies either slip or some mechanical compensation must be made to account for this cornering phenomenon. A conventional freewheel assembly which uses a dog and pawl, well known to those skilled in the bicycle art, can be interposed between the front ring gear and the front wheel to compensate for this cornering phenomenon. In an alternative embodiment, a freewheel apparatus using a ratchet ball bearings can be formed as an integral element in the front gear assembly to compensate for this cornering phenomenon.

Single speed bicycles could be assembled with the same drive means, connected to the rear wheel, an elongate flexible shaft and motive means as previously described for multi-speed bicycles.

The present invention can also be applied to bicycles which utilize a rigid direct drive shaft instead of the conventional endless chain. Once the present invention becomes well known, an elongate flexible shaft may even supplant the conventional endless chain to drive the rear wheel. The present invention can be applied to any type bicycle which has a means to drive the rear wheel.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally, effective embodiments.

FIG. 2 is a view taken from the opposite side of the front wheel as shown in FIG. 1.

DESCRIPTION OF THE PREFERRED EMBODIMENT

Figure 1:
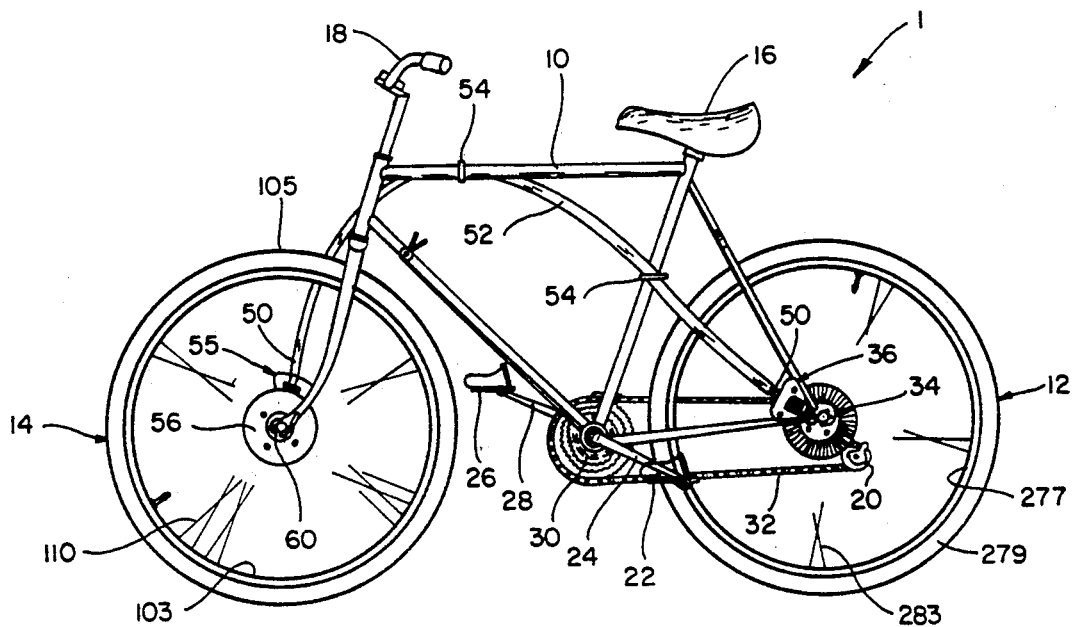
FIG. 1 is a side elevational view of a dual wheel driven multi-speed bicycle.

FIG. 1 is a side elevation view of a multi-speed dual wheel driven bicycle generally identified by the numeral 1. The bicycle 1 includes a frame 10, a rear wheel generally identified by the numeral 12 and a front wheel generally identified by the numeral 14. An adjustable seat 16 is mounted in a conventional manner on the frame 10; handlebars 18 are also mounted in a conventional manner on the frame 10. The mounting and operation of the seat 16 and the handlebars 18 ar both well known to those skilled in the art. The multi-speed bicycle 1 utilizes a conventional drive system and a conventional derailleur mechanism 20 also well known to those skilled in the art. The conventional drive system includes pedals, cranks, a pedal sprocket, a continuous chain and a rear sprocket.

The left pedal 22 connects to the left crank 24. The right pedal 26 connects to the right crank 28. The cranks 24 and 28 connect to and rotate the pedal sprocket 30. On multi-speed bicycles, the pedal sprocket 30 includes several sprockets with different diameters as shown in the drawing. A continuous chain 32 connects the pedal sprocket 30 with the rear sprocket 288, not shown. A rear ring gear 34 attaches to the rear wheel 12. A rear gear assembly is generally identified by the numeral 36 and attaches to the frame 10 adjacent to the rear ring gear 34.

One end of the elongate flexible shaft or cable 50 connects to the rear gear assembly 36 and is driven thereby. The elongate flexible shaft 50 is enclosed and shrouded by an open ended elongate casing 52. There is sufficient clearance between the inside diameter of the casing 52 and the outside diameter of the shaft 50 to allow the shaft 50 to rotate freely and independently of the casing 52.

The casing 52 and the elongate flexible shaft 50 are held in a relatively rigid position by retaining straps 54 or other suitable means which secure the casing 52 to the frame 10. If the shaft 50 is not held in a relatively stiff position by the casing 52, it may kink when torque is applied. Kinking of the shaft 50 prevents further transmission of rotational motion or torque. The casing 52 when secured to the frame by retaining straps 54 prevents kinking of the shaft 50. Other suitable means to secure the casing 52 to the frame 10 would include, for example, guides welded or glued to the frame 10, heavy duty tape to secure the casing 52, or epoxy adhesive to glue the casing 52 directly to the frame 10. Another suitable means to secure the casing 52 would be an elongate open-ended metal tube attached to the frame 10. The casing 52 would pass through the elongate open-ended tube and be secured thereby.

In an alternative embodiment, a shortened open ended tube would be attached to the frame 10 in lieu of the casing 52. The shaft 50 would pass through the tube. There would be enough clearance between the inside diameter of the tube and the outside of the diameter of the shaft 50 to allow the shaft to freely rotate in the tube; however, the tube would be long enough and stiff enough to prevent the shaft from kinking when torque is applied.

The elongate flexible shaft 50 connects on its opposite end to a front gear assembly generally identified by the numeral 55. A front ring gear 56 is mounted on the front wheel 14. The front gear assembly 55 transfers rotational movement of the elongate flexible shaft 50 to the front ring gear 56 which transfers the rotational movement to the front wheel 14. In the preferred embodiment, a freewheel assembly 60 is mounted between the front ring gear 56 and the hub of the front wheel 14 to compensate for the cornering phenomenon, previously discussed.

Figure 2:
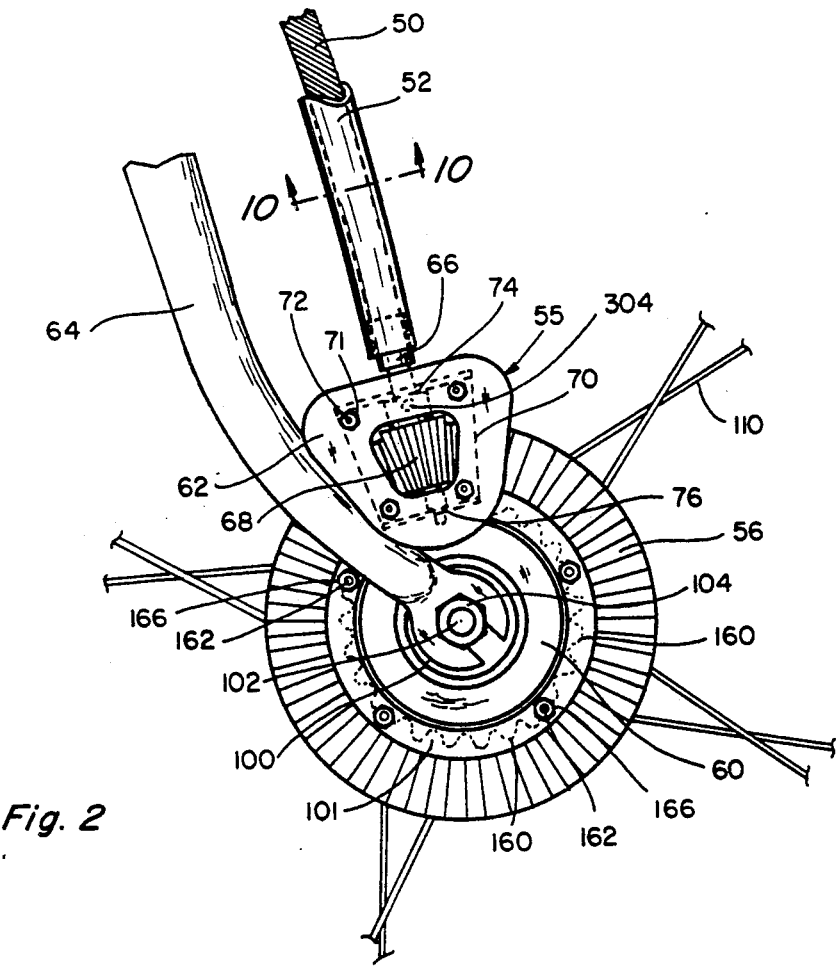
FIG. 2 is an enlargement of the front ring gear, the freewheel assembly, the front gear assembly, a portion of the frame and a portion of the elongate flexible shaft.

FIG. 2 is an enlarged view of the front gear assembly 55, the front ring gear 56 and the freewheel assembly 60. The front gear assembly 55 includes a front mounting bracket 62 which is welded or attached by other suitable fastening mean to the right front fork 64 of the frame 10. The casing 52 is shown in a cut-away view to reveal the elongate flexible shaft or cable 50. An elongate rigid coupling 66 is connected by any suitable means to one end of the elongate flexible shaft 50. The coupling 66 is rigidly connected by a locking rod 304 to the front pinion gear 68 which is mounted in a housing 70, shown in phantom. The housing 70 is attached by a plurality of nuts 71 and bolts 72 or other suitable fastening means to the bracket 62.

To reduce friction, the coupling 66 is supported in the housing 70 by a first bushing 74 and a second bushing 76. Those skilled in the art will recognize that there are many types of bushings suitable for this application including, self lubricating plastic bushings or graphite impregnated bronze bushings. Those skilled in the art will also recognize that other types of friction reducing apparatus, such as a roller bearing, could be substituted for the aforementioned bushings.

A conventional freewheel assembly 60 threads onto the threaded shoulder 108 of the front hub 100 A threaded front axle 102 extends through the front hub 100. The front axle 102 is secured by a first nut 104 and a second nut 114 to the fork 64 of the frame 10. The freewheel assembly 60 is captured between the front ring gear 56 and a retainer ring 101 which are held together by a plurality of nuts 166 and bolts 162 or other suitable fastening means.

Figure 3:
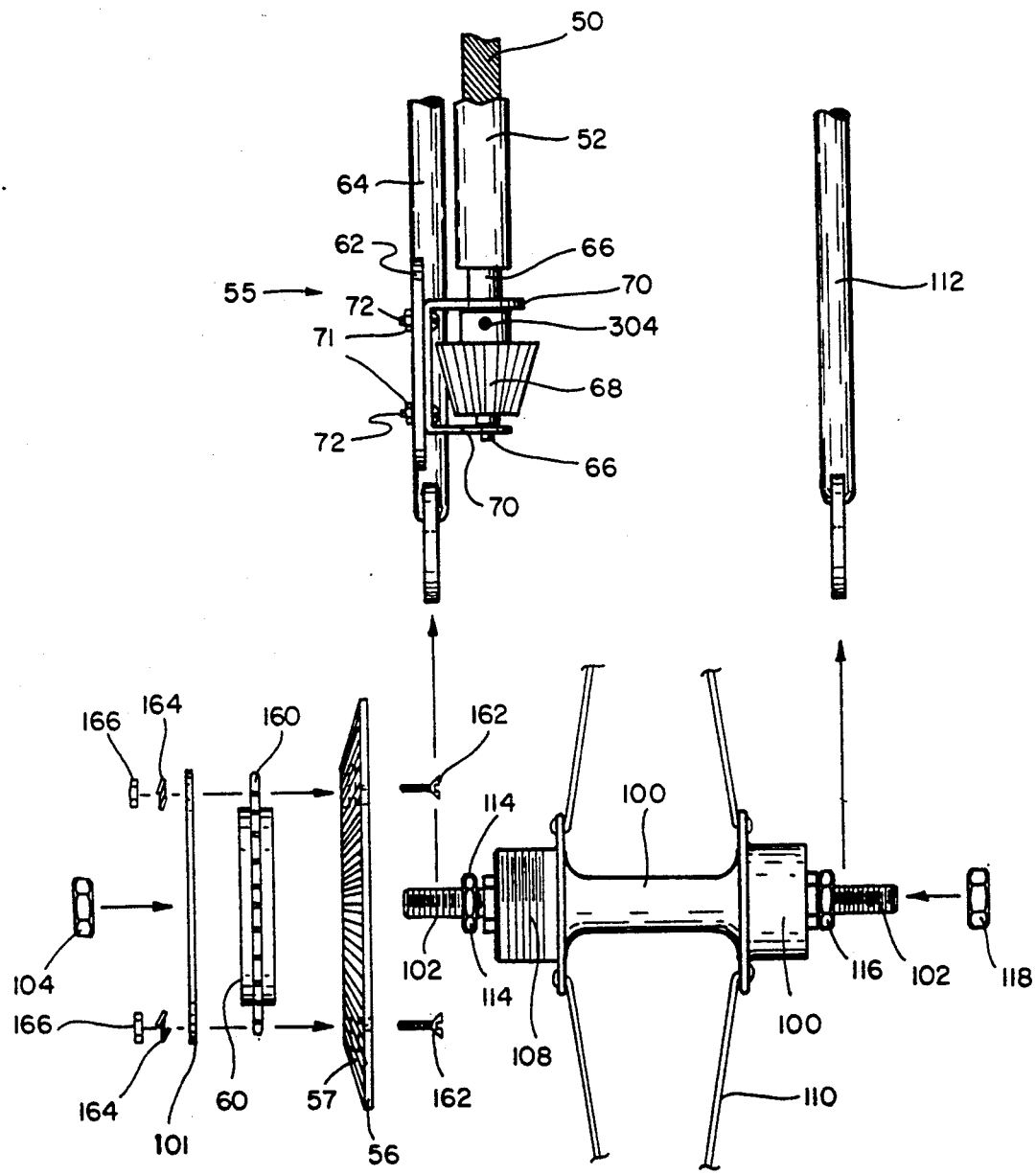
FIG. 3 is an exploded and enlarged view of the front hub and related components, the front gear assembly and a portion of the frame.

FIG. 3 is an enlarged and exploded view of the front hub 100 and the front gear assembly 55. The front hub includes a threaded shoulder 108. The freewheel assembly 60 threadably engages the shoulder 108 of the hub 100. The freewheel assembly 60 is captured between the front ring gear 56 and a retainer ring 101 which are held together by a plurality of nuts 166 and bolts 162 or other suitable fastening means. The axle 102 extends through the front hub 100 and protrudes on the other side as shown in the drawing. The axle 102 is conventionally mounted in a manner well known to those skilled in the art allowing the front hub 100 to rotate freely and independently of the axle 102.

The axle 102 mounts on the right fork 64 and the left fork 112 of the frame 10 as shown by the arrows in FIG. 3 in a conventional manner. The axle 102 is rigidly connected to the right fork 64 by a first nut 104 and second nut 114 which tighten upon the right fork 64. The axle 102 is rigidly connected to the left fork 112 by a third nut 116 and a fourth nut 118 which tighten upon the left fork 112.

As well known to those skilled in the art, a plurality of spokes 110 extend from the front hub 100 and engage the rim 103 of a conventional wheel. The term front wheel as used herein typically includes the axle 102, the front hub 100, a plurality of spokes 110, the rim 103 and the tire 105.

The casing 52 is shown in a cut-away view to reveal the elongate flexible shaft 50. The casing 52 needs to be flexible enough to accommodate the curvature of the shaft 50, but it must also be stiff enough to prevent kinks in the shaft 50 when secured to the frame, as previously discussed. A front coupling 66 is connected to one end of the elongate flexible shaft 50. The coupling 66 is rigidly connected to the front pinion gear 68 by locking rod 304. A housing 70 supports the front pinion gear 68 and is rigidly connected to the bracket 62 by a plurality of nuts 71 and bolts 72 or other suitable fastening means. The bracket 62 is welded to the front right fork 64 of the frame 10 or is connected by other suitable fastening means.

The front gear assembly of the preferred embodiment, generally identified by the numeral 55 typically includes the front pinion gear 68, the bushings 74 and 76, the housing 70, the bracket 62 and suitable fastening means to connect the housing to the bracket. In the preferred embodiment, the term motive means includes the front gear assembly 55, and the front ring gear 56.

In the preferred embodiment, the front ring gear 56 is formed with a beveled surface 57 and a straight tooth profile to better engage the front pinion gear 68. Those skilled in the art will recognize that other gears with different shapes are within the scope of this invention, such as, but not limited to, spiral bevel gears or spur and face gears.

Figure 4:
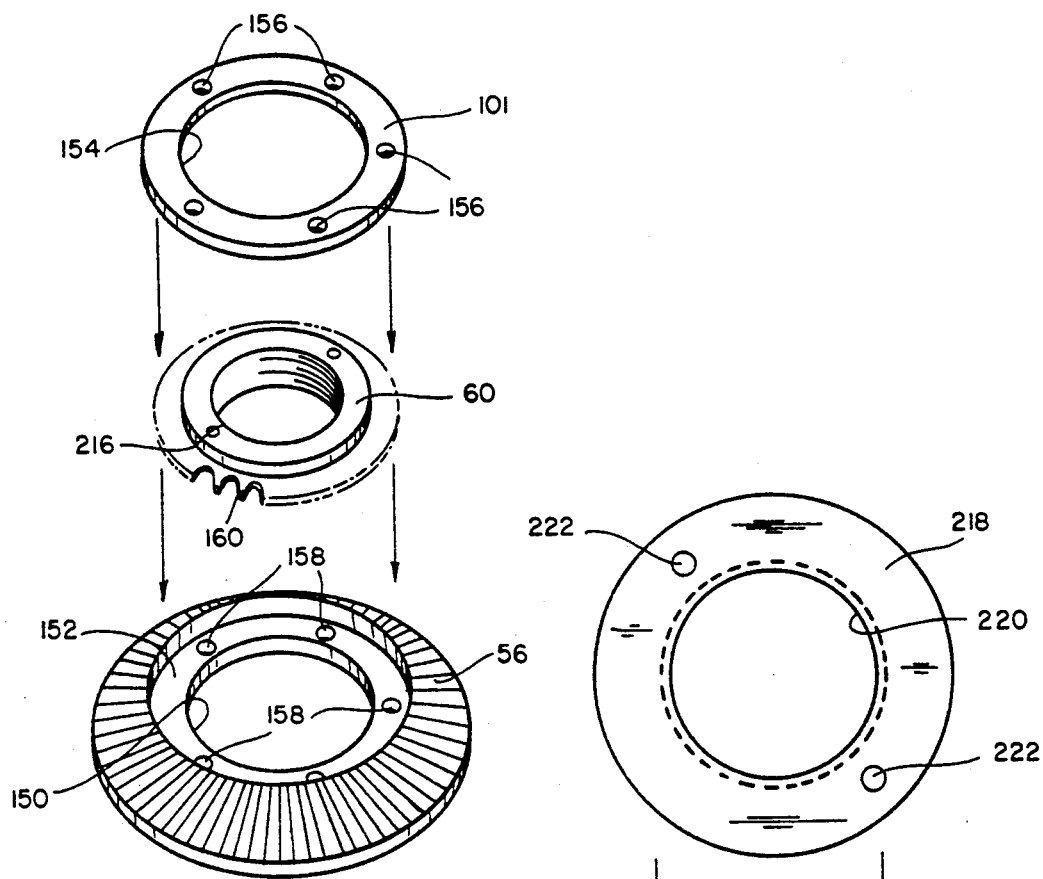
FIG. 4 is an exploded enlargement of the front ring gear, the freewheel assembly and the retainer ring.

FIG. 4 is an enlarged and exploded view of the front ring gear 56, the freewheel assembly 60 and the retainer ring 101 shown in FIG. 3. In the preferred embodiment, the front ring gear has 66 teeth and the front pinion gear has 12 teeth; however, those skilled in the art will recognize that the number of teeth can be increased or decreased depending on manufacturing convenience and gear design. In the preferred embodiment, the ring gear 56 and the pinion gear 68 are manufactured from a composite material sold under the tradename Nylatron and are purchased from Process Gear of Chicago, Ill. This composite material is believed to be a combination of nylon, carbon and perhaps glass fibers. It is within the scope of this invention to manufacture the ring gear 56 and the pinion gear 68 from other substances using a different number of teeth or a different tooth profile.

The ring gear 56 has a central bore 150 and a cavity 152 which encircles the bore 150. The cavity 152 is sized and arranged to receive the freewheel assembly 60. As shown by the arrows in the drawing, the freewheel assembly 60 fits into the cavity 152 of the front ring gear 56.

A retainer ring 101 is provided to capture the freewheel assembly 60 in the cavity 152 of the front ring gear 56 as shown by the arrow in the drawing. The retainer ring 101 has a central bore 15 which is sized and arranged to fit over the freewheel assembly 60 as shown in the drawing. The retainer ring 101 has a plurality of holes 156 therethrough which are positioned to align with a plurality of holes 158 in the cavity 152 of the front ring gear 56.

As well known to those skilled in the art, the freewheel assembly 60 is fully encircled about its outer circumference by a plurality of gear teeth 160, only a portion of which are shown in the drawing. The assembly process for the front ring gear and freewheel assembly would be as follows. First, the freewheel assembly 60 would be placed in the cavity 152 of the front ring gear 56. Second, the gear teeth 160 would be aligned so as not to obstruct the holes 158 in the ring gear 56.

Third, the retainer ring 101 would be placed over the freewheel assembly 60. The holes 156 in the retainer ring would be aligned with corresponding holes 158 in the ring gear 56. Fourth, a plurality of bolts 162 would be placed through the holes 158 in the ring gear 56 and the holes 156 in the retainer ring 101. A plurality of lock washers 164 would then be placed over the bolts 162. Finally, a plurality of nuts 166 would threadably engage the plurality of bolts 162 thereby capturing the freewheel assembly between the retainer ring 101 and the front ring gear 56. When assembled the bolts 162 would engage the teeth 160 of the freewheel assembly 60 and prevent unintentional spinning in the cavity 152.

Figure 5:
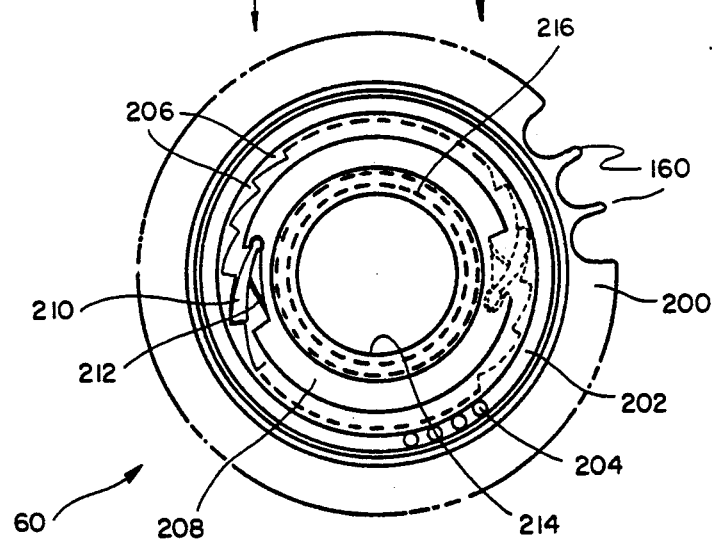
FIG. 5 is an enlargement of the dog and pawl freewheel assembly of FIG. 4 in a partially disassembled view.

FIG. 5 shows the freewheel assembly 60 in a partially disassembled view. Those skilled in the bicycle art will be fully aware of the design and operation of the freewheel assembly 60 which can be purchased in bicycle shops throughout the country. The freewheel assembly 60 uses a conventional dog and pawl design and is discussed herein solely as a matter of thoroughness. Conventional bicycles with caliper brakes will often use the assembly shown in FIG. 5 as the rear sprocket for purposes of driving the rear wheel. The same apparatus can be used on the front wheel of the dual wheel driven bicycle.

The freewheel assembly 60 has three primary components: an inner hub 208, an outer hub 200, and a cap 218. A plurality of gear teeth 160 extend outwardly from the circumference of the outer hub 200. The outer hub 200 has a first internal circumferential raceway 202 which is filled with a plurality of ball bearings 204. An opposing internal circumferential raceway and plurality of ball bearings are located on the opposite side of the outer hub 200, not shown in the drawing.

The freewheel assembly 60 works on a conventional dog and pawl mechanism well known to those skilled in the art. The interior diameter of the hub 200 forms a plurality of dogs or teeth 206.

Extending from the inner hub 208 is a pivotally mounted pawl or ratchet 210. The pawl 210 is urged into engagement with the dogs 206 by spring means 212. Two or more pawls are typically arranged on the inner hub 208, as shown in phantom. The interior bore 214 of the inner hub 208 is threaded to engage the shoulder 108 of the front hub 100. A tubular protrusion 216 encircles the central bore 214 and extends outwardly from the inner hub 208. The outside diameter of the protrusion 216 is threaded. A cap 218 is formed with a threaded central bore 220 to engage the outside diameter of the protrusion 216. The cap 218 has two depressions 222 formed therein which act as lugs for engaging a special wrench to tighten the cap on the protrusion 216. To complete the assembly of the freewheel assembly 60, the cap 218 is placed over the protrusion 216 and aligned with the threads thereon. The cap 218 is screwed onto the protrusion 216. A lug wrench engages the depressions 222 and tightens the ca against the outer hub 200.

When a bicycle is going around corners, the front wheel 14 will be rotating faster than the back wheel 12. The freewheel assembly 60 therefore allows the front hub 100 and the front tire 105 to move in a forward direction freely and independently of the ring gear 56 which will be turning at a slower rate due to the aforementioned cornering phenomena.

Figure 6:
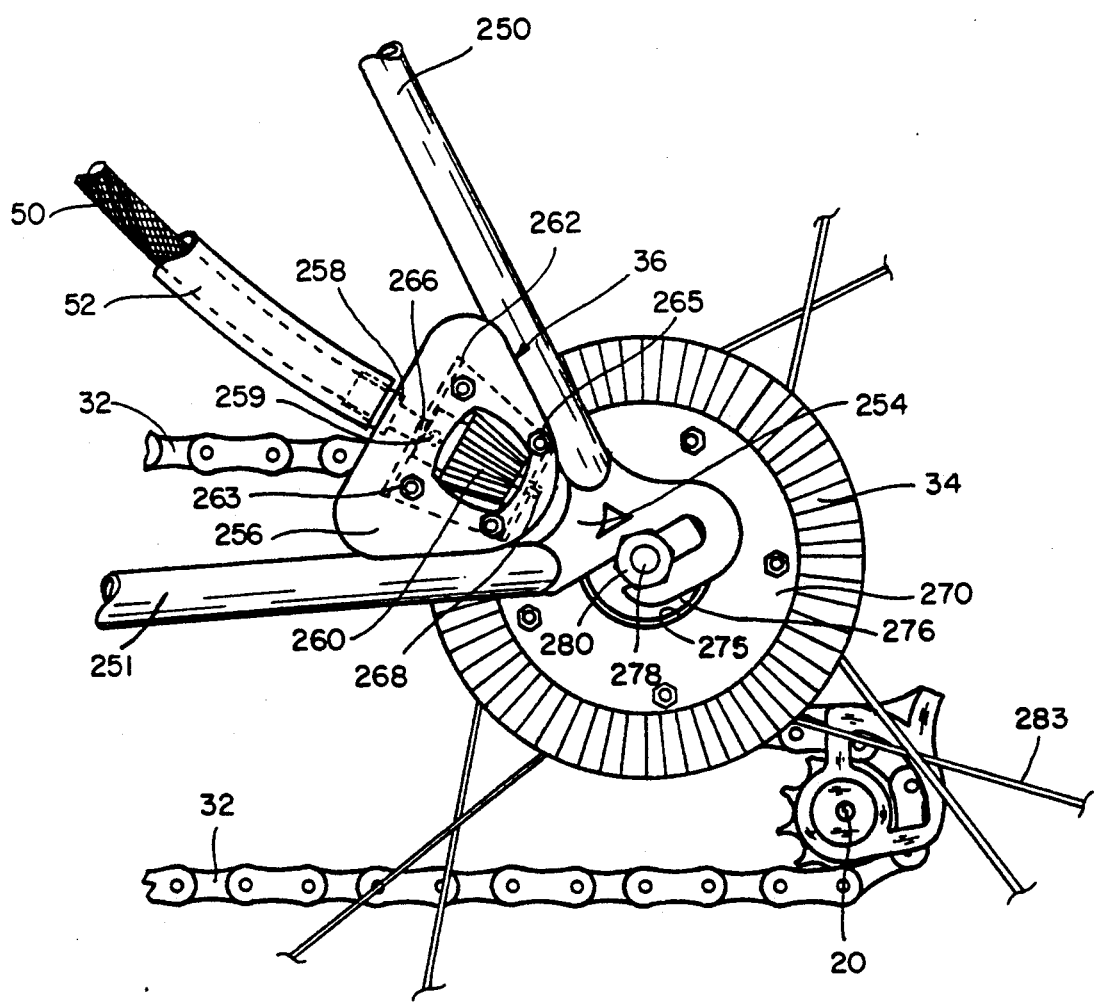
FIG. 6 is an enlargement of the rear ring gear, the rear gear assembly, the derailleur mechanism, a portion of the frame and a portion of the elongate flexible shaft.

FIG. 6 is an enlargement of the rear ring gear 34 and the rear gear assembly, generally identified by the numeral 36. The frame 10 includes a first frame member 250 and a second frame member 251 which are joined at the rear wheel mounting bracket 254.

The rear gear assembly 36 includes a mounting bracket 256 which is welded or secured by other suitable fastening means to the first frame member 250 and the second frame member 251 of the frame 10.

The casing 52 is shown in a partial cut-away view exposing the elongate flexible shaft 50. A rear coupling, 258, shown in partial phantom view is attached to the end of the elongate flexible shaft 50. For the sake of brevity the term elongate flexible shaft as used herein may also include both the rear coupling 258 and the front coupling 66.

The rigid coupling 258 is secured by a locking rod 259 to a rear pinion gear 260. The rear pinion gear is supported in a housing 262 shown in phantom. The housing 262 is attached to the bracket 256 by a plurality of nuts 263 and bolts 265 or other suitable fastening means. The rear pinion gear 260 is supported in the housing 262 by a first bushing 266 and a second bushing 268. An insert 270 is rigidly attached to the rear ring gear 34 by a plurality of nuts 271 and bolts 273 or other suitable fastening means. The interior bore 275 of the insert 270 is threaded to engage the threaded shoulder 274 of the rear hub 276. An axle 278 extends through the rear hub 276, The axle 278 engages the rear wheel mounting bracket 254 and is locked onto the frame by the first nut 280 and the second nut 290. As well known to those skilled in the art, a plurality of spokes 283 extend from the hub 276 and support the rim 277 of the rear wheel 12. For the sake of brevity, the term rear wheel may also include the axle 278, the rear hub 276, the rear spokes 283, the rear rim 277 and the rear tire 279.

A conventional derailleur system 20 engages the chain 32 as is well known to those skilled in the art.

Figure 7:
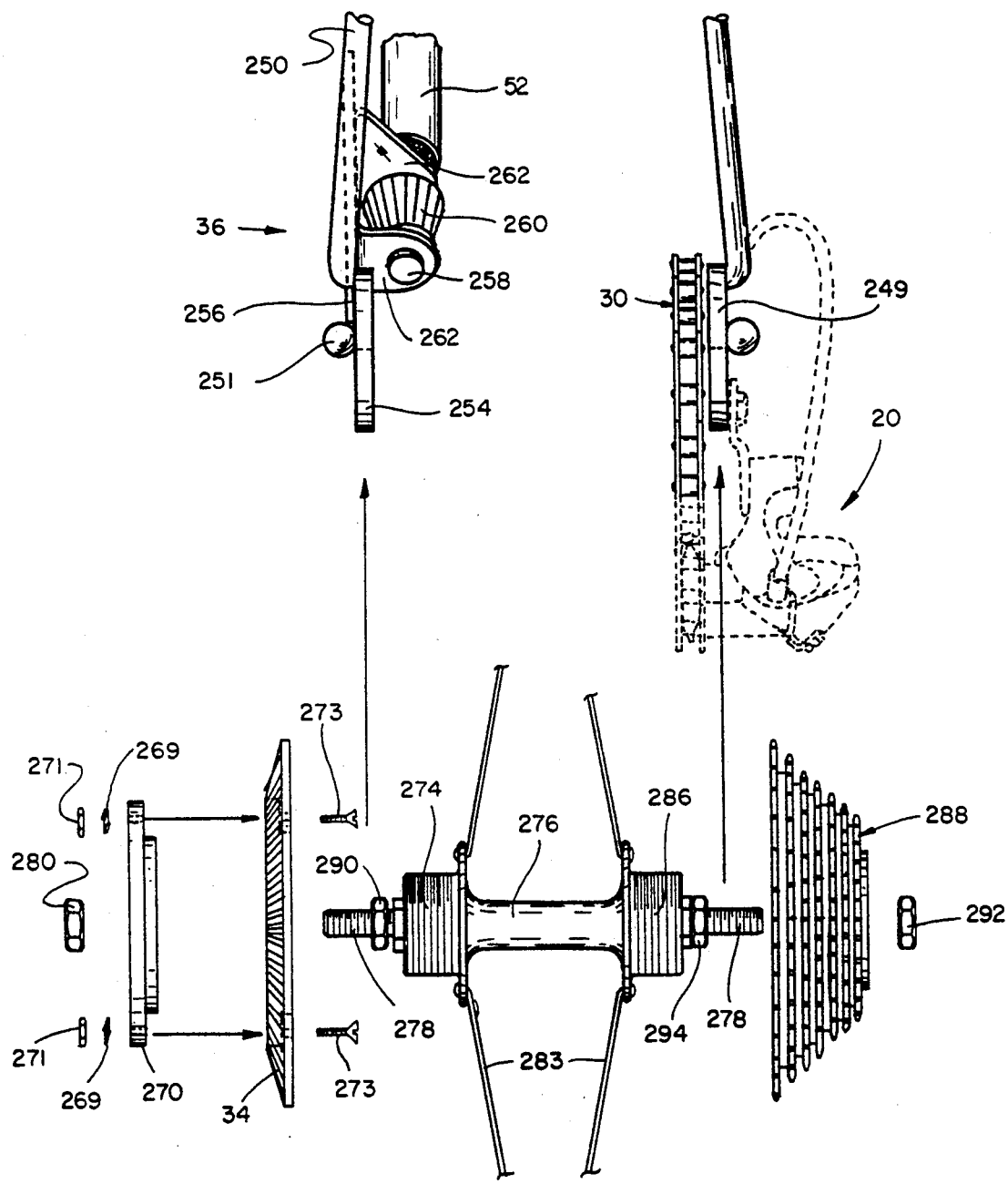
FIG. 7 is an exploded and enlarged view of the rear hub and related components, the rear gear assembly and a portion of the frame.

FIG. 7 is an enlarged and exploded view of the rear hub 276, rear ring gear 34 and the rear gear assembly generally identified by the numeral 36.

The rear hub 276 includes a threaded left shoulder 274 and a threaded right shoulder 286. A central axle 278 extends through the rear hub 276. The rear hub and axle rotate freely and independently of each other as well known to those skilled in the art. The rear sprocket 288 includes a conventional dog and pawl freewheel device not shown, to allow one to coast. The freewheel assembly in the rear sprocket 288 threadably engages the right shoulder 186 of the rear hub 276. The insert 270 for the rear ring gear 34 threadably engages the left shoulder 274 of the rear hub 276.

The rear ring gear 34 could also be mounted on the spokes 283 would be equivalent to the mounting system which threads the insert 270 and rear ring gear 34 on the left shoulder 274 of rear hub 276. Applicant believes that mounting the rear ring gear 34 and insert 270 on the rear hub represents the best mode in which to practice this invention.

The rear wheel is placed onto the frame 10 as shown by the arrows in the drawing. A first nut 280 tightens against a second nut 290 to lock one side of the axle 278 against rear wheel mounting bracket 254 of the frame 10. A third nut 292 is tightened against a fourth nut 294 to lock the axle 278 onto the opposing rear wheel mounting bracket 249 of the frame 10. The term drive means includes the rear gear assembly 36, and the rear ring gear 34 with insert 270 held in place by suitable fastening means.

Figure 8:
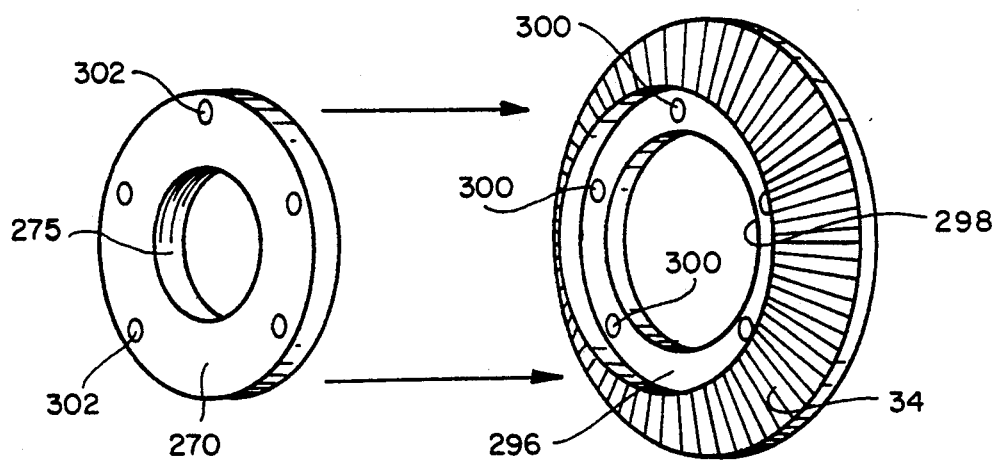
FIG. 8 is an exploded enlargement of the rear ring gear and rear insert.

FIG. 8 is an enlarged view of the rear ring gear 34 and the insert 270. Those skilled in the art will recognize that it is within the scope of this invention to manufacture the rear ring gear 34 in a integral fashion with the insert 270.

The rear ring gear has a cavity 296 formed in the center thereof sized and arranged to receive the insert 270. The rear ring gear also has a central bore 298 which is large enough to avoid interference with the threaded shoulder 274 of the rear hub 276. The rear ring gear 34 has a plurality of holes 300 passing therethrough. The insert 270 likewise has a plurality of holes 302 therethrough which align with the holes 300 in the rear ring gear 34. To assemble the rear ring gear 34, the insert 270 is dropped in the cavity 296 and the plurality of bolts 273 are passed through the holes 300 and 302 and secured by a plurality of lock washers 269 and nuts 271 thereby rigidly locking the insert 270 into the cavity 296 of the rear ring gear 34. The insert 270 has a central threaded bore 275 sized and arranged to threadably engage the shoulder 274 of the rear hub 276.

Figure 9:
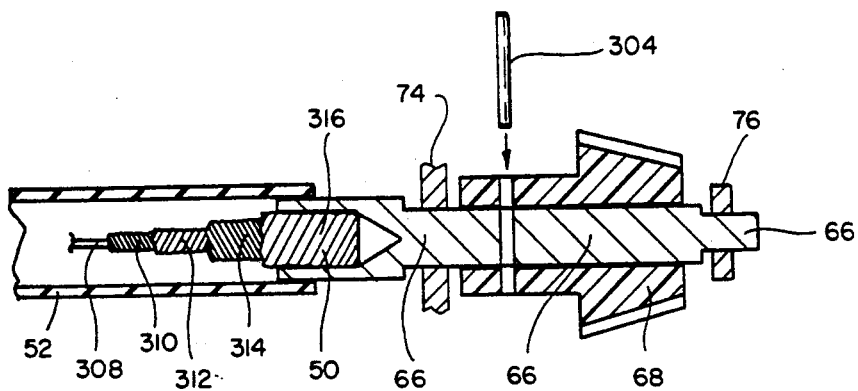
FIG. 9 is an enlargement of the elongate flexible shaft, casing and pinion gear.

FIG. 9 is an enlarged partial section view of the elongated flexible shaft or cable 50, the front coupling 66 and the front pinion gear 68. The opposite end of the shaft 50 has a similar configuration. The elongate flexible shaft in the preferred embodiment may be manufactured to various lengths depending on the frame size of the bicycle.

The elongate flexible shaft 50 is connected for example by soldering to the rigid coupling 66. Applicant has found that high antimony solder works well for this purpose. The coupling 66 could also be pressed onto the shaft 50. Other suitable means are available for making the connection between these two components. A first bushing 74 and a second bushing 76 support the coupling 66 and reduce friction. The pinion gear 68 is rigidly connected to the coupling 66 with a locking rod 304.

As shown in this drawing, the elongate flexible shaft 50 has multiple opposing layers about a central core 308. This central core is generally formed from a single segment. Surrounding the central core 308 is a first multi-stranded layer of metal wires 310 wound on a bias about the core 308. A second multi-stranded layer of metal wires 312 is wound about the first multi-stranded layer 310 on a bias in the opposite direction. A third multi-stranded layer of metal wires 314 is wound on a bias about the second multi-stranded layer 312 in the opposite direction. A fourth multi-stranded layer of metal wires 316 is wound on a bias about the third multi-stranded layer 314 in a the opposite direction.

For the sake of brevity only four layers of wire have been shown in this drawing; however, those skilled in the art will recognize that a typical three eighths inch diameter elongate flexible shaft will generally have more than four layers of wire about the core. The number of layers of wire in an elongate flexible shaft is a matter of manufacturing design which varies between different manufacturers. The number of layers of wire also varies as the diameter of the shaft changes. Elongate flexible shafts are typically manufactured in diameters from one-eighths of an inch to one and one-half inches. As long as the flexible shaft will transfer the rotational motion or torque from the rear gear assembly to the front gear assembly, any flexible shaft will suffice.

Figure 10:
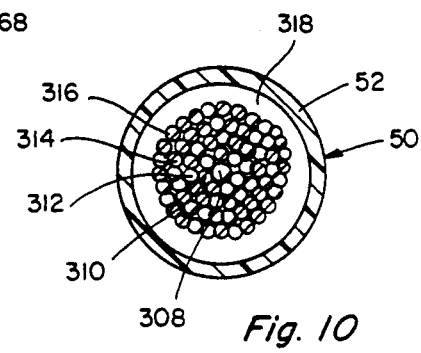
FIG. 10 is a cross-section view of the elongate flexible shaft and casing taken along the line 10—10 of FIG. 2.

FIG. 10 is a section view of the casing 52 and the elongate flexible shaft 50 taken along the line 10—10 of FIG. 2. A single strand core 308 is disposed in the center of the shaft 50. The first multi-stranded layer 310 surrounds the core. The second opposing multi-stranded layer 312 surrounds the first multi-stranded layer 310. The third opposing multi-stranded layer 314 surrounds the second multi-stranded layer 312. The fourth opposing multi-stranded layer 316 surrounds the third multi-stranded layer 314. The casing 52 encloses the elongate flexible shaft 50; however, there is enough clearance 318 between the interior diameter of the casing 52 and the exterior diameter of the elongate shaft 50 to allow free and independent movement of the shaft 50 when the casing 52 is held in a stiff condition by the retaining straps 54.

Elongate flexible shafts have been used in non-bicycle applications for many years. For example, such shafts are used to drive speedometers and various types of grinding and drilling machinery and to mechanically actuate by remote control valves and power seats. These elongate flexible shafts are readily available both in the U.S. and abroad from manufacturers such as S. S. White Industrial Products of Piscataway, N.J., B. W. Elliott Manufacturing Co., Inc. of Binghamton, N.Y., Stow Manufacturing Co. of Binghamton, N.Y., and Schuner Industrial Products Corp. of Rome, Ga. and Bragg, Switzerland. These shafts come in three basic types as follows: a) a first design for counter-clockwise application of torque; b) a second design for clockwise application of torque and c) bi-directional shafts for operation in both directions. In the preferred embodiment, Applicant recommends a three eighth inch diameter shaft which will transfer torque in a clockwise direction when viewed from the drive end of the shaft.

Figure 11:
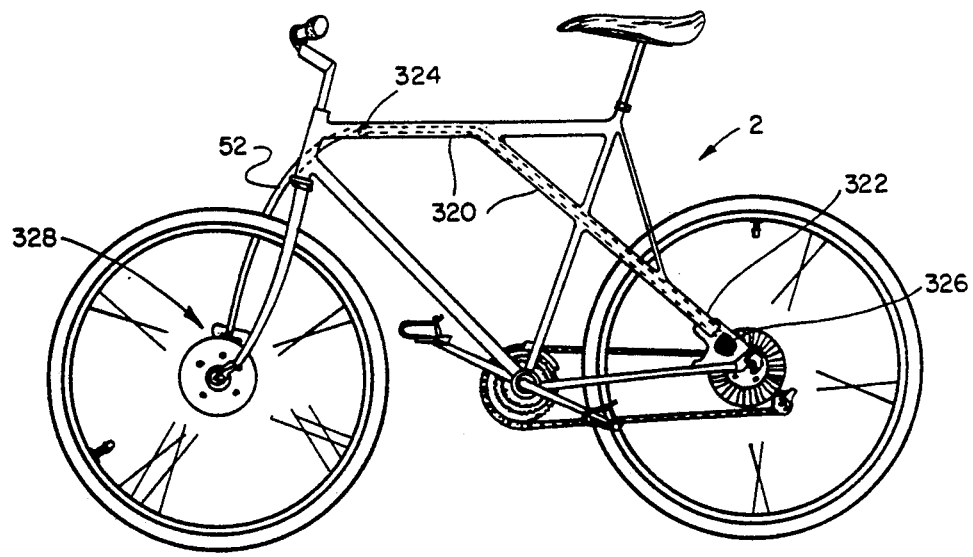
FIG. 11 is an alternative embodiment of the dual wheel drive bicycle shown in FIG. 1. The frame is modified to accommodate and enclose a portion of the elongate flexible shaft and casing.

FIG. 11 shows an alternative embodiment of the apparatus shown in FIG. 1. The dual wheel drive bicycle 2 in FIG. 11 has a modified frame 320 which allows a portion of the elongate flexible shaft 50 and the casing 52 to pass through the frame. The modified frame 320 has an inlet port 322 and an outlet port 324 formed in the tubular members. The inlet port 322 is near the rear wheel and allows the casing 52 and the elongate flexible shaft 50 to enter the frame. The frame must be so sized and arranged to allow free and independent movement of the elongate flexible shaft 50 inside of the casing 52.

Figure 12:
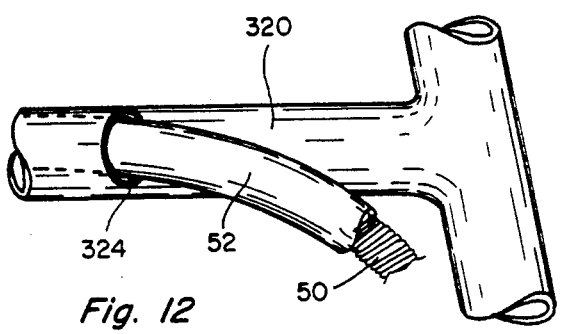
FIG. 12 is a view of a portion of the frame of the bicycle shown in FIG. 11 from the opposite side showing the elongate flexible shaft and casing exiting the frame.

FIG. 12 shows a portion of the frame 320 from the opposite side as shown in FIG. 11. The outlet port 324 is more clearly seen in this view.

The elongate flexible shaft 50 connects on one end to the rear gear assembly 326. The casing 52 and the elongate flexible shaft 50 enter the inlet port 322 and pass through the frame 320, and exit through the outlet port 324. The opposite end of the shaft 50 connects to the front gear assembly 328.

Referring to FIGS. 13–16, an alternative to the front gear assembly 54 is shown. In this alternative embodiment, the free-wheel assembly utilizes a ratchet instead of the dog and pawl arrangement shown in FIG. 5. A sprocket or front ring gear 350 has alternating rows of gear teeth 352 and notches or groves 354. Blades 357 of the cable gear 358 engage teeth 352 of sprocket 350 for driving the sprocket and causing the front wheel to rotate.

Sprocket 350 also has an axial passage which fits over axle 356 for mounting sprocket 350 onto the axle. Sprocket 350 may be secured to the spokes or hub of the wheel in a conventional manner.

Figure 14:
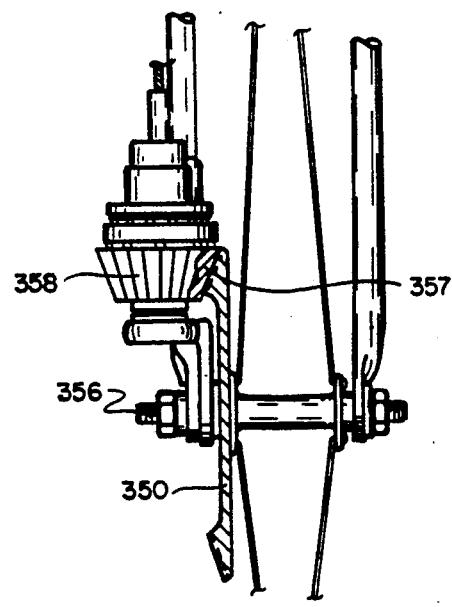
FIG. 14 is a front view of the front gear assembly shown in FIG. 13.

As shown in FIG. 14, cable gear 358 is shown having blades 357 cut in the gear surface for meshing with front wheel sprocket 350. Gear 358 is rotatably mounted on a vertical shaft 360 which is supported out from the front wheel frame fork 362. An angle bracket 364 is mounted to the front axle 356 and receives vertical shaft 360 at its extended end. Vertical shaft 360 is threaded at one end for receiving a nut 361 and a washer 366. A bearing stop 368 and ring bearing (or roller bearing) 370 support gear 358 permitting the gear to rotate freely.

The upper portion of angle bracket 364 is adjustable connected to a horizontal bracket member 372. The extended end of bracket 372 holds an annular nut 374 which faces gear 358 and rotatably receives cable 50. The end of cable 50 is secured to a cable driver 376 located between annular nut 374 and gear 358. Bearings 378, 380 located above and below the cable driver permit its rotational movement as cable 50 is turned.

Figure 16:
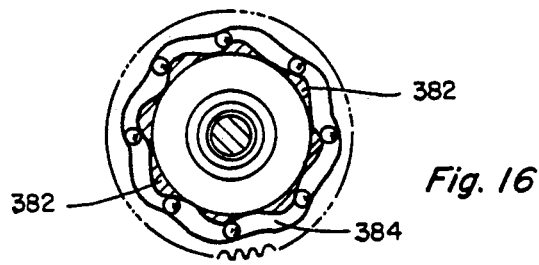
FIG. 16 is a partial section view of the ratchet and ball bearing freewheel mechanism taken along the line 16—16 of FIG. 15.
Figure 15:
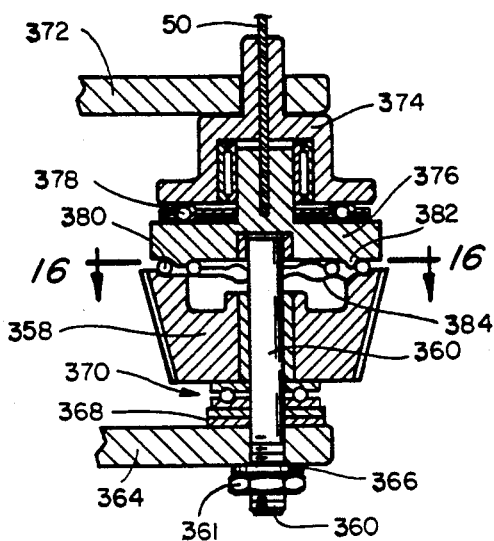
FIG. 15 is a section view of the front gear assembly shown in FIG. 13.
Figure 13:
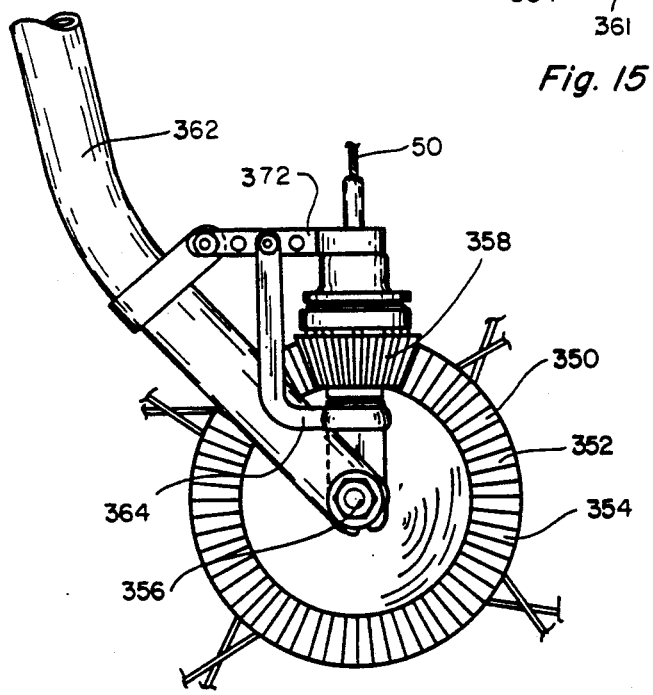
FIG. 13 is an alternative embodiment of the front gear assembly which includes a ratchet and ball bearing type freewheel mechanism.

As shown in FIGS. 15 and 16, the bottom surface of cable driver 376 includes ratchet teeth 382 for permitting ratcheting, freewheeling, movement of the cable driver 376 with respect to gear 358. Similarly gear 358 includes ratchet surfaces 384 on its upper surface for permitting movement of the front wheel during, for example, coasting when the pedals are not being driven.

While the foregoing is directed to the preferred embodiment of the present invention, other and further embodiments of the invention may be devised without departing from the basic scope thereof, and the scope thereof is determined by the claims which follow.

I claim:

1. A dual wheel driven bicycle including a conventional drive system having pedals, a pedal sprocket, a chain and a rear sprocket comprising:
   (a) a frame;
   (b) a rear wheel mounted on said frame:
   (c) a rear ring gear mounted on said rear wheel;
   (d) a front wheel mounted on said frame;
   (e) a front ring gear mounted on said front wheel;
   (f) propulsion means for driving said front wheel, said propulsion means including:
      (1) a rear gear assembly mounted on said frame including a rear gear to engage and be driven by said rear ring gear;
      (2) a front gear assembly mounted on said frame including a front gear to engage and drive said front ring gear; and
      (3) an elongate flexible shaft connected on one end to said rear gear and on the opposite end to said front gear, said shaft transferring the rotational motion of said rear ring gear to said front wheel; and
   (g) a freewheel assembly permitting said front wheel to rotate in a forward direction when driven by the rotational force from said elongate flexible shaft and permitting said front wheel to rotate in a forward direction freely and independently of said elongate flexible shaft when the rate of rotation of said front ring gear exceeds the rate of rotation of said rear gear.

2. A dual wheel driven bicycle including a conventional drive system having pedals, a pedal sprocket, a chain and rear sprocket, comprising:
   (a) a frame;
   (b) a rear wheel mounted on said frame;
   (c) a rear ring gear mounted on said rear wheel;
   (d) a front wheel mounted on said frame;
   (e) a front ring gear including a freewheel assembly mounted on said front wheel; and
   (f) propulsion means for driving said front wheel, said propulsion means including:
      (1) a rear gear assembly mounted on said frame including a rear gear to engage and be driven by said rear ring gear;
      (2) a front gear assembly mounted on said frame including a front gear to engage and drive said front ring gear; and
      (3) an elongate flexible shaft connected on one end to said rear gear and on the opposite end to said front gear, said shaft transferring the rotational motion of said rear ring gear to said front wheel.

3. A dual wheel driven bicycle including a conventional drive system having pedals, a pedal sprocket, a chain and rear sprocket, comprising:
   (a) a frame;
   (b) a rear wheel mounted on said frame;
   (c) a rear ring gear mounted on said rear wheel;
   (d) a front wheel mounted on said frame;
   (e) a front ring gear including a freewheel assembly mounted on said front wheel;
   (f) propulsion means for driving said front wheel, said propulsion means including:
      (1) a rear gear assembly mounted on said frame including a rear gear to engage and be driven by said rear ring gear;
      (2) a front gear assembly mounted on said frame including a front gear to engage and drive said front ring gear; and
      (3) an elongate flexible shaft connected on one end to said rear gear and on the opposite end to said front gear, said shaft transferring the rotational motion of said rear ring gear to said front wheel;
   (g) an elongate open ended casing having a central longitudinal bore, said casing enclosing a portion of said elongate flexible shaft, said bore sized and arranged to permit said shaft to freely rotate in said bore of said casing; and
   (h) means to secure said elongate flexible casing to the frame.

4. A dual wheel driven bicycle including a conventional drive system having pedals, a pedal sprocket, a chain and rear sprocket, comprising:
   (a) a frame;
   (b) a rear wheel mounted on said frame;
   (c) a rear ring gear mounted on said rear wheel;
   (d) a front wheel mounted on said frame;
   (e) a front ring gear mounted on said front wheel; and
   (f) a propulsion means for driving said front wheel, said propulsion means including:
      (1) a rear gear assembly mounted on said frame including a rear gear to engage and be driven by said rear ring gear;
      (2) a front gear assembly mounted on said frame including a freewheel assembly and gear to engage and drive said front ring gear; and
      (3) an elongate flexible shaft connected on one end to said rear gear assembly and on the opposite end to said front gear assembly, said shaft transferring the rotational motion of said rear ring gear to said front wheel.

* * * * *